Nov. 3, 1925.

J. A. DARY 1,559,556

MILK CAN CLEANER AND STERILIZER

Filed Feb. 14, 1922      3 Sheets-Sheet 1

Inventor
J. A. Dary
By
his Attorney

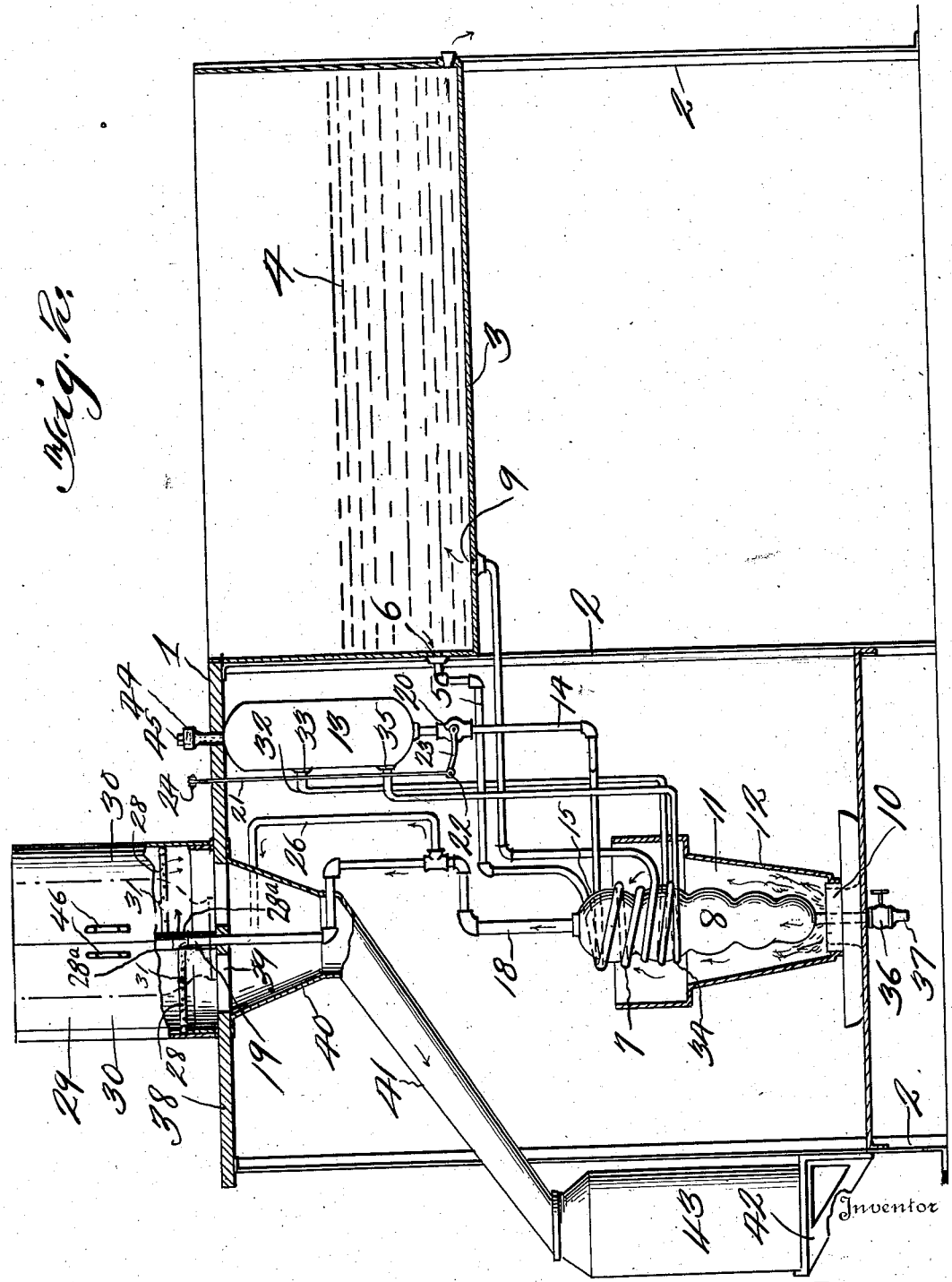

Nov. 3, 1925.
J. A. DARY
1,559,556
MILK CAN CLEANER AND STERILIZER
Filed Feb. 14, 1922     3 Sheets—Sheet 3
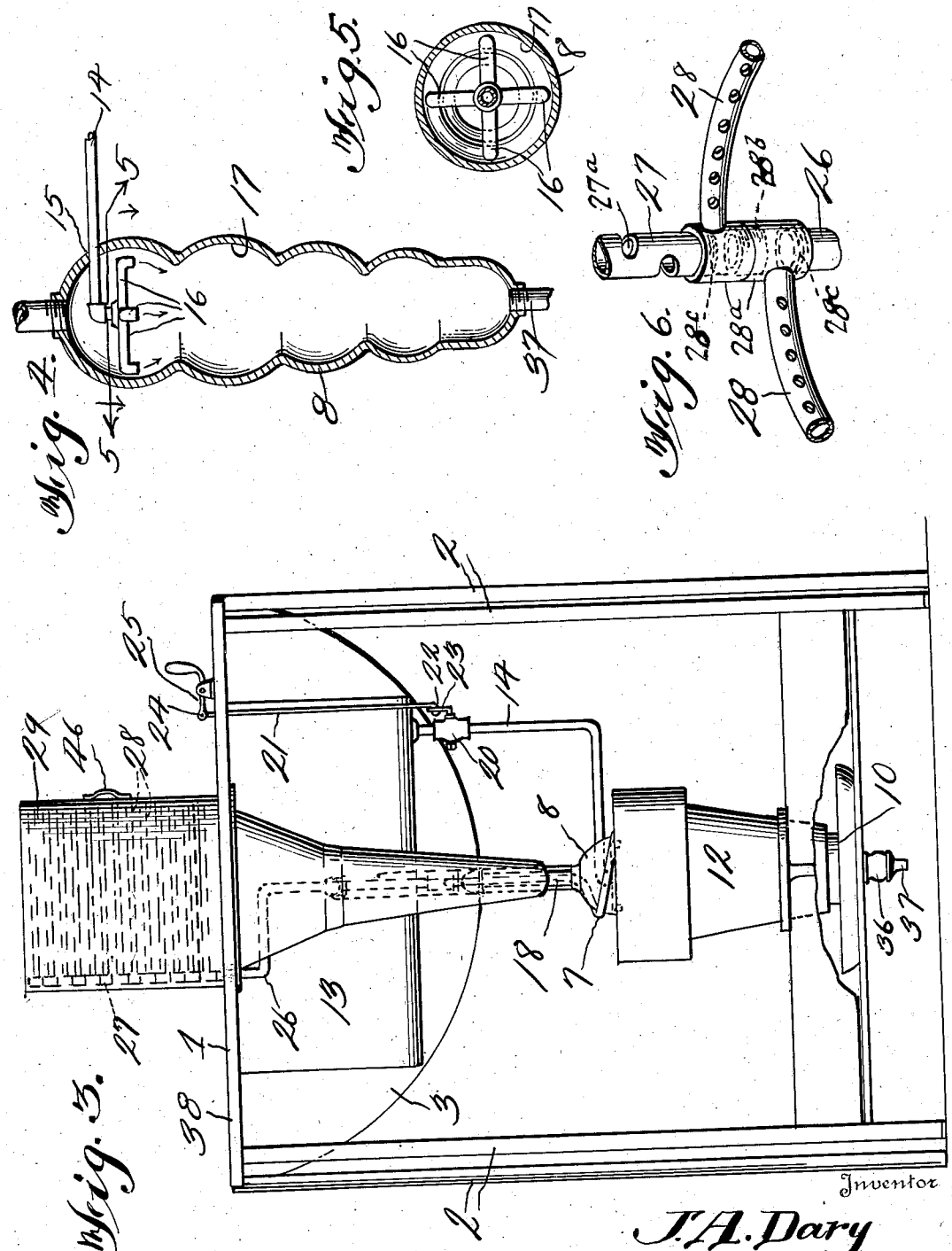
Inventor
J. A. Dary
By D. Swift
his Attorney Patented Nov. 3, 1925.

1,559,556

UNITED STATES PATENT OFFICE.

JAMES A. DARY, OF OTTAWA, KANSAS.

MILK-CAN CLEANER AND STERILIZER.

Application filed February 14, 1922. Serial No. 536,439.

*To all whom it may concern:*

Be it known that I, JAMES A. DARY, a citizen of the United States, residing at Ottawa, in the county of Franklin, State of Kansas, have invented a new and useful Milk-Can Cleaner and Sterilizer; and I do hereby declare the following to be a full, clear, and exact description of the invention, such as will enable others skilled in the art to which it appertains to make and use the same.

The invention relates to can cleaners and sterilizers, particularly adapted for use in connection with cleaning and sterilizing milk cans at receiving stations by applying steam to the interior and exterior of the can simultaneously, thereby sterilizing the can, and at the same time dislodging cream from the interior thereof. Also to provide means whereby the dislodged cream will be conveyed to receptacles.

A further object is to provide a liquid vaporizer for steaming milk cans, said vaporizing comprising a steam drum into which limited amounts of water are passed, vaporized and allowed to pass into engagement with the interior walls of the milk can and the exterior walls thereof, and to provide means for heating the drum.

A further object is to provide a liquid supply tank in connection with the steam drum through the medium of a pipe, said pipe having valve means whereby the flow of water through the pipe may be controlled. Also to provide in connection with the liquid supply tank a pipe having a coil extending around the steam drum in such a manner that the liquid within the tank will be maintained heated by the steam drum and the heating element.

A further object is to provide in connection with the device a can washing sink, which sink has in connection therewith a coil extending around the steam drum thereby allowing the steam drum and the heating element, located beneath the drum, to be utilized for maintaining the water within the sink heated.

With the above and other other objects in view the invention resides in the combination and arrangement of parts as hereinafter set forth, shown in the drawings, described, and claimed, it being understood that changes in the precise embodiment of the invention may be made within the scope of what is claimed without departing from the spirit of the invention.

In the drawings:—

Figure 2 is a vertical longitudinal sectional view through the device.

Figure 3 is an end elevation of the device.

Figure 4 is a vertical sectional view through the steam drum.

Figure 5 is a horizontal sectional view through the steam drum taken on line 5—5 of Figure 4.

Figure 6 is a perspective view of portions of the perforated pipes within the cylindrical can receiving member.

Figure 1:
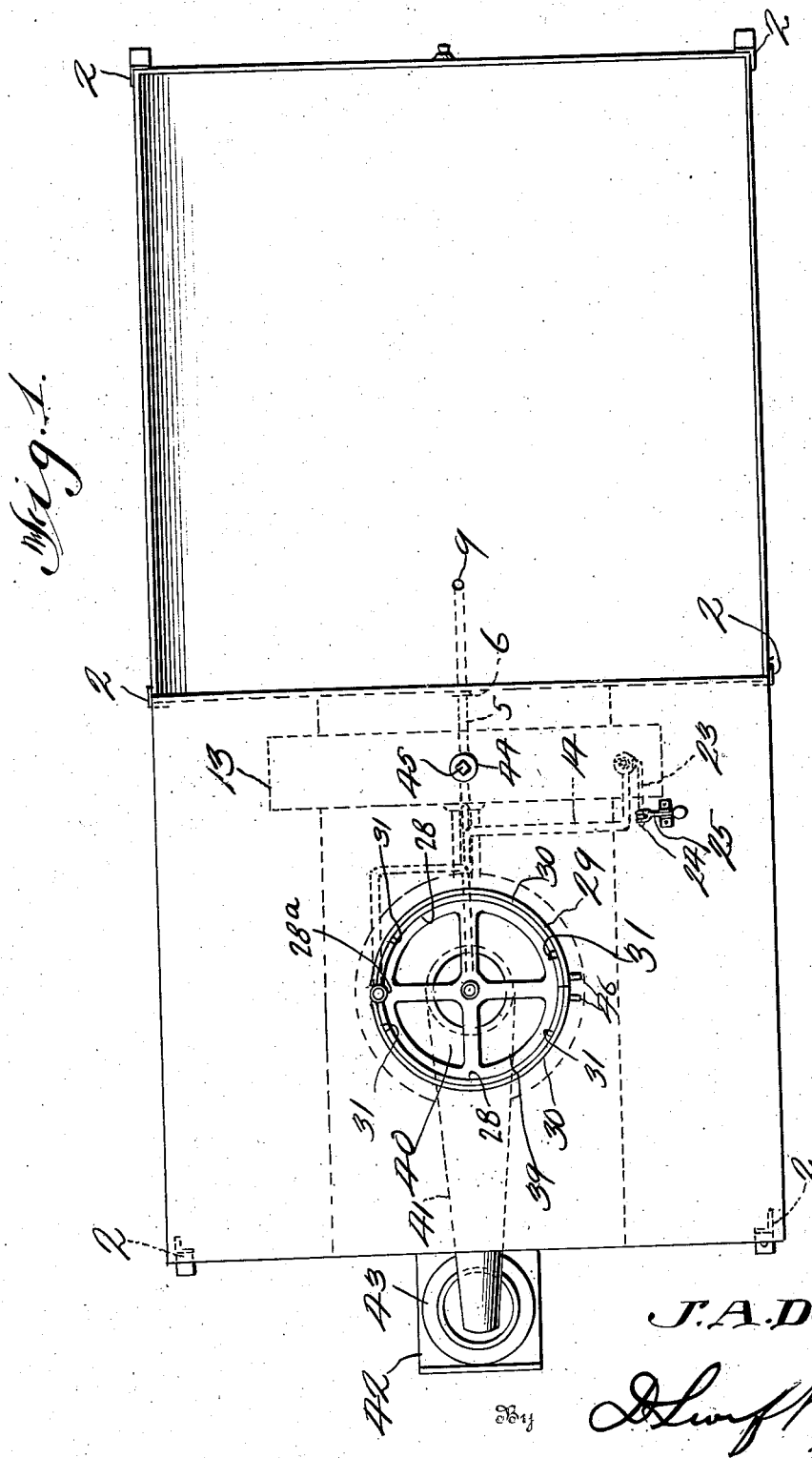
Figure 1 is a top plan view of the device.

Referring to the drawings, the numeral 1 designates a table, which table is supported on legs 2. The legs 2 and the table 1 also support a sink 3, in which cans may be washed as desired. The water in the sink 3 is maintained heated by means of the pipe 5, which is connected at 6 to the sink, and is provided with a coil 7 which extends around the steam drum 8 and through which pipe 5 and coil 7, the water from the sink 3 passes and returns to the sink at 9. It will be seen that when the heating element 10, which may be a lamp or any other form of heating element, is in operation, that the heat therefrom may pass upwardly through the chamber 11 of the casing 12 and will maintain the coil 7 heated, thereby causing a circulation of water from the sink 3, which during its circulation will be maintained hot for can washing purposes.

Disposed beneath the table 1 is a water supply tank 13, and extending downwardly from said tank 13 is a pipe 14, which pipe enters the upper end of the steam dome 8 at 15 and terminates in outwardly extending arms 16 through which water in predetermined quantities passes and is forced in engagement with the inner wall 17 of the steam drum 8 where it is vaporized by the heat of the drum and the heat from the heating element 10. After the water has been vaporized it passes upwardly through the pipe 18 and is discharged through the end 19 of said pipe at a point where it will enter the interior of a milk can inverted and supported over the end 19 of the pipe 18. The amount of water allowed to flow into the steam drum 8 is controlled by means of the valve 20, which valve is operated by the connecting rod 21, the lower end of which is connected at 22 to the valve lever 23 and the upper end connected at 24 to the rockable operating lever 25. In practice it has been found that by allowing about one ounce of water to enter a steam drum 8 all of said water quickly vaporizes and is of a sufficiently high temperature to sterilize the interior of the can through pipe 19 and the exterior thereof through the pipe 26, the upper end of which terminates in a vertically disposed perforated pipe 27 having pivotally mounted thereon to swing in a horizontal plane segmentally shaped perforated pipes 28, communicating with the perforations 27a in pipe 27, which pipes 28 project the steam against the outer periphery of the milk can when disposed in inverted position over the end 19 of the pipe 18, and within the casing 29. The segmentally shaped perforated pipes 28 are provided with sleeves 28a which are connected together by means of a bushing 28b and are threaded at 28c to the pipes 26 and 27. Bushing 28b connects the adjacent ends of the sleeves 28a, however it does not overlie the inner ends of the pipes 28, therefore it will be seen that steam will pass through the pipe 26, the sleeves 28a, bushing 28b to the perforated pipes 27 and 28. The casing 29 is preferably formed from two segmentally shaped sections 30 to which are secured the segmentally shaped pipes 28 at 31, which allows the casing 29 to be easily and quickly opened for placing a milk can to be cleaned and sterilized therein. It has been found that it is desirable to heat the water within the supply tank 13. To accomplish this result the pipe 32 is connected to the tank 13 at 33, which pipe extends downwardly and is provided with a coil 34 extending around the steam drum 8, and through which coil water from the supply tank 13 passes and is heated by the drum 8 and the heating element 10, and then passes back into the tank 13 at 35. It will be seen that a continuous circulation of water from the tank 13 is maintained and that the water within the tank 13 will have a high temperature before it enters the vaporizing drum 8, thereby insuring quick and rapid vaporization of the water. If water should collect within the drum 8, it may be easily and quickly removed by opening the valve 36 carried by the drain pipe 37. The top 38 of the table 1 is provided with an opening 39 over which the mouth of the milk can is disposed, in such a manner that the steam passing outwardly from the end 19 of the steam pipe 18 will enter the interior of the can substantially centrally thereof. Extending downwardly from the under side of the table top 38 and in registration with the opening 39 in the table top is a conically shaped annular member 40, the lower end of which terminates in a downwardly and outwardly extending tubular portion 41, which terminates adjacent one side of the device and preferably above the supporting platform 42 on which a receptacle 43 is supported. It will be seen that cream which is dislodged from the interior of the milk can by the steam will be conveyed downwardly and outwardly and discharged into a receptacle, and consequently saved.

It will be seen that a milk can sterilizer and cleaning device is provided, wherein steam is used and that the device is so constructed that the danger of explosion is absolutely eliminated, and no matter how much water is allowed to enter the steam drum 8, when the same is expanded or vaporized, it will immediately pass upwardly through the pipes 18 and 26, the discharge ends of which are open at all times. It will also be seen that the cream which adheres to the inner wall of the can will be saved, and that the cream is dislodged by the application of external and internal heat on the walls of the can. It has been found that the application of heat to the outer face of the can more readily and quickly dislodges cream from the inner face of the can, than the direct application of internal heat only.

The water supply tank 13 is provided with a filling pipe 44 normally closed by the plug 45, and through which filling pipe water may be placed in the supply tank 13. The segmentally shaped sections 30 are provided with handles 46 adapted to be grasped by the operator in opening and closing the casing 29, when placing a can in position or removing the same.

The invention having been set forth what is claimed as new and useful is:—

1. A can washing device comprising a table, a cylindrical casing disposed on said table, said casing being formed from segmentally shaped independently movable sections, a water supply pipe at one side of the casing, perforated horizontally disposed pipes pivotally connected to the water supply pipe and adapted to receive water therefrom, said horizontally disposed perforated pipe being secured to the casing sections and a pipe extending upwardly through the table into the casing.

2. A can washing machine comprising a table, a cylindrical casing disposed on said casing, said casing being formed from segmentally shaped sections, a water supply pipe, said water supply pipe being disposed at one side of the casing, horizontally disposed hollow perforated arms, hingedly connected to the water supply pipe and carried by the segmentally shaped sections within the sections and to which water is supplied from the water supply pipe and a pipe extending upwardly through the table substantially axially of the casing.

In testimony whereof I have signed my name to this specification.

JAMES A. DARY.